United States Patent
Minagawa et al.

[15] 3,673,152
[45] June 27, 1972

[54] ENHANCEMENT OF RESISTANCE OF OLEFIN POLYMERS TO COPPER-CATALYZED OXIDATIVE DEGRADATION

[72] Inventors: Motonobu Minagawa, Koshigaya; Kenichi Nakagawa; Minoru Goto, both of Tokyo, all of Japan

[73] Assignee: Argus Chemical Corporation, Brooklyn, N.Y.

[22] Filed: May 23, 1969

[21] Appl. No.: 827,166

[30] Foreign Application Priority Data

May 27, 1968 Japan.....................................43/35426

[52] U.S. Cl. ........................260/45.8 N, 252/400, 252/401, 252/402, 252/403, 252/404, 260/23 H, 260/45.7 P, 260/45.7 S, 260/45.75 R, 260/45.8 SN, 260/45.85, 260/45.95
[51] Int. Cl. ........................................................C08f 45/60
[58] Field of Search..............................260/45.8 N, 45.8 SN

[56] References Cited

UNITED STATES PATENTS

| | | | |
|---|---|---|---|
| 3,436,362 | 4/1969 | Hayer et al. | 260/23.7 |
| 3,560,434 | 2/1971 | Abramoff | 260/45.8 |
| 3,549,572 | 12/1970 | Minagawa et al. | 260/23 |
| 3,270,016 | 8/1966 | Duennenberger et al. | 260/248 |
| 3,391,106 | 7/1968 | Bloom et al. | 260/45.8 |
| 3,531,479 | 9/1970 | Harris et al. | 260/240.1 |

*Primary Examiner*—Donald E. Czaja
*Assistant Examiner*—R. A. White
*Attorney*—Janes & Chapman

[57] ABSTRACT

Heterocyclic amines or amides are provided which are useful in the enhancement of the resistance of olefin polymers to copper-catalyzed oxidative deterioration.

Stabilizer compositions are also provided consisting essentially of at least one olefin polymer stabilizer and heterocyclic amines or amides; and olefin polymer compositions, such as propylene polymer compositions, containing heterocyclic amines or amides; and a process for enhancing the resistance of olefin polymers to copper-catalyzed degradation by incorporation of such compounds or of such stabilizer compositions.

15 Claims, No Drawings

ENHANCEMENT OF RESISTANCE OF OLEFIN POLYMERS TO COPPER-CATALYZED OXIDATIVE DEGRADATION

This invention relates to novel heterocyclic amines or amides, which are useful in the enhancement of the resistance of olefin polymers, such as propylene polymers, to copper-catalyzed oxidative deterioration; to stabilizer compositions consisting essentially of at least one olefin polymer stabilizer, and a heterocyclic amine or amide, and to olefin polymer compositions having an enhanced resistance to copper-catalyzed degradation in physical properties due to incorporation therein of such compounds or of the above stabilizer composition, and to a process of enhancing the resistance of olefin polymers to cooper-catalyzed degradation by incorporation of such compounds or of such stabilizer compositions.

Polypropylene is a tough, hard, relatively flexible, high-melting polymeric material, and thus has a number of important applications, such as, for example, as electrical insulation for copper wires and cables. However, in several respects the stability of polypropylene leaves much to be desired. The polymer shows a tendency to decrease rapidly in melt viscosity and then to become brittle when kept at elevated temperatures for the time required in milling, calendering, extrusion, injection molding, and fiber-forming equipment. This deterioration is particularly serious when the polymers are worked in a molten state in the presence of oxygen, for example, air. It is known in the art that degradation in one or more physical properties of polypropylene due to heat can be inhibited by the incorporation of a number of well known thermal antioxidants, including hindered phenols, secondary aromatic amines, organic phosphites, and thiodipropionic acid esters.

A special problem is presented when the polypropylene is contaminated by or is used in contact with copper. Thus, polypropylene employed as insulation for copper wires and cables becomes useless after a few months. In fact, it has been found that oxidative degradation of polypropylene occurs at an extremely rapid rate in the presence of copper, even when the polymer contains effective antioxidants. Hansen et al., *Journal of Polymer Science*, Part A, 2, 587–609 (1964), report at page 589 that "The catalytic effect of copper on the thermal oxidation of polypropylene is not as drastic in the *absence* of antioxidants as it is in their presence" (Emphasis added). Where polypropylene contains an antioxidant, in the presence of copper "the rate of oxidation becomes rapid and constant after a drastically shortened induction period compared with that obtained in the absence of copper." (page 590). "The induction period in oxygen at 140° C for polypropylene stabilized by the addition of 0.5 weight percent of 4,4'-thiobis(3-methyl- 6-tert-butylphenol) is decreased from about 400 hours to 40 hours by the presence of copper. Similar 90 percent losses in the effectiveness of this antioxidant in the presence of copper have been observed over a range of temperatures." (page 591).

To inhibit copper-catalyzed oxidation, conventional copper chelating agents and metal deactivators have been added to polypropylene compositions containing thermal antioxidants. As reported by Hansen et al., supra, at page 593, "All of these materials were found to be unsatisfactory for a variety of reasons. Most of them did not diminish the catalytic activity of copper and copper compounds. Some actually accelerated the already rapid copper-catalyzed oxidation of polypropylene, and might be useful in other reactions where oxidation is sought rather than avoided. The best of the conventional deactivators (for example, N,N'-di-β-naphthyl-p-phenylenediamine) were only slightly effective in curtailing the catalytic activity of copper." It is also reported that other conventional and commercial metal inhibitors or deactivators, such as ethylene-diamine tetraacetic acid and its salts, 2,2'-bipyridyl, 8-quinolinol, N,N'-disalicylidene-1,2-propanediamine, and benzimidazole, either were ineffective or only slightly effective, and usually had other disadvantages, including instability, incompatibility, water-solubility, volatility, formation of highly colored products, and reaction with other components of the polypropylene composition.

A number of compounds have been suggested, for use in suppressing copper-catalyzed oxidation of polypropylene. Hansen et al., supra, and British Pat. No. 974,274, to Western Electric Company, Inc., recommend oxamide and compounds derived from oxamide which contain the radical

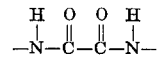

for inhibiting copper-catalyzed oxidation of polypropylene. Hansen et al report that polypropylene compositions containing 0.5 percent by weight antioxidant and 0.5 percent by weight oxamide or substituted oxamide retained between 30 to 80 percent of the effectiveness of the antioxidant in the presence of copper, while when oxamide or its derivatives were not used, only between 1 and about 15 percent of the normal induction period for an antioxidant was observed.

Hansen et al, *Polymer Engineering and Science*, Vol.5 October 1965, pages 223 to 226, reported that nitrobenzohydrazides, oxalydihydrazide and its derivatives, triazines, triazoles, triazolines, and tetrazoles, are effective copper inhibitors. However, many of these compounds destroy the effectiveness of antioxidants, such as N-phenyl-2-naphthyl-amine, 4,4'-thiobis(3-methyl-6-tertiary-butylphenol) and 6,6'-di-tert-butyl-4,4'-bis-o-cresol.

A number of other compounds which are apparently useful as copper deactivators and inhibit copper-catalyzed oxidation of polypropylene are known. U.S. Pat. No. 3,110,696 to Dexter discloses compounds of the formula

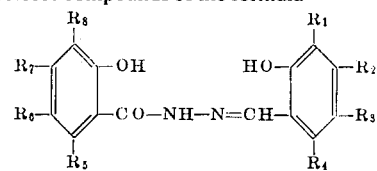

wherein the R radicals are hydrogen, alkyl, alkoxy or phenyl. Dexter prefers N'-salicylidene-N'-salicylhydrazide.

U.S. Pat. No. 3,117,104 to Bown et al discloses oxaldihydrazides having the formula

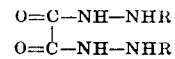

where R is an alkyl of up to 16 carbon atoms, mono-aryl or naphthenyl, having from five to 12 carbon atoms. Such compounds are shown to reduce the stabilizing effectiveness of dilauryl thiodipropionate in the presence of copper by about 75 percent.

British Pat. No. 994,116 to Shell teaches that stabilizer combinations which contain (a) an organic sulfur compound of the type $R_1-S_xR_2$, wherein $x$ is an integer of up to 2 and $R_1$ and $R_2$ are alkyl, aralkyl, or cycloalkyl, having from eight to 25 carbon atoms and (b) a polynuclear polyphenol consisting of a benzene ring substituted with $n$ 3,5-dialkyl-4-hydroxybenzyl groups wherein $n$ is 3 or 4, are effective in protecting alkene polymers, prepared by a low-pressure polymerization process, such as the Ziegler process, against deterioration caused by light, heat and oxygen. However, it is stated that these stabilizer compositions are incapable of protecting the polymer effectively against deterioration in properties caused by contact between copper and polymer. In discussing the prior art, it is indicated that British Pat. No. 890,761 discloses stabilizer combinations offering protection against deterioration caused by contact between copper and polymer, viz. a combination comprising a diester of a beta-thiodipropionic acid and a bis-phenol obtained by the condensation reaction of 1 mol of saturated aldehyde or ketone having four to six carbon atoms or of sulphur dichloride and 2 mols of a phenol having a non-reactive ortho substituent and a non-substituted para ring carbon atom. British Pat. No. 951,931 also discloses the incorporation of a diester of beta-thiodipropionic acid in combination with a certain trisphenolic compound which is obtained by the condensation reaction of either 1 mol of unsaturated aldehyde or ketone and 3 mols of phenol having a non-reactive ortho or para hydrocarbon substituent, or 1 mol of hydroxyaryl-substituted saturated aldehyde or ketone and 2 mols of phenol having a non-reactive ortho or para hydrocarbon substituent, into polymers in order to stabilize the latter against deterioration caused by contact with copper.

However, British Pat. No. 994,116 states at page 2, column 1, that "the stability of such polymer compositions containing the relevant stabilizer combinations comprising these diesters plus said bis- or trisphenolic compounds leaves much to be desired when these compositions — whether or not in contact with copper — are exposed to elevated temperatures. This gives rise to serious difficulties during the manufacture of the insulated electric conductors from which the insulating material consists of such stabilized compositions, since these are manufactured by coating the conductor with heat-plastified or molten polymer material. As is known, high temperatures, generally higher than 150° C, are used when such coatings are applied. Moreover, electric conductors coated with such stabilized compositions are, of course, not very suitable for use at elevated temperatures."

British Pat. No. 994,116 suggests that this problem can be met by incorporating in the polymer together with the organic sulfur compound and a polynuclear polyphenol, a bis or trisphenolic compound obtained by the reaction of either a saturated or unsaturated aldehyde or ketone, of sulfur dichloride, and a phenol having at least one ortho-ring carbon atom bound to a secondary or tertiary alkyl group. Apparently, the bis- or trisphenolic compound when employed with the above stabilizers protects the polymer against deterioration caused by contact between copper and polymer even when the polymer is exposed to elevated temperatures, such as 150° C and above.

British Pat. No. 951,936 to Imperial Chemical Industries, Limited, discusses the problem of protection of polyolefins containing phenolic antioxidants against copper-catalyzed oxidative deterioration. The phenolic compounds are said to be especially effective as antioxidants when they are used in conjunction with an organic sulfur compound having a molecular weight of at least 250. This patent provides a polymeric composition suitable for use in close contact with copper, which composition comprises a solid polymer of propylene, particularly isotactic polypropylene, a phenolic antioxidant, and nonvolatile primary or secondary aromatic or aliphatic amino compounds, the secondary aromatic amino compounds having at least one nitrogen atom to which is attached not more than one aryl group. These amines are, in general, not those which are generally preferred as antioxidants in rubber and plastics. Many of these amino compounds, e.g., p-aminoacetanilide, do not confer any extra protection on polypropylene stabilized with mixtures of phenolic compounds and sulphur compounds in the absence of copper, and do not prevent the degradation of polypropylene in the presence of copper when they are used in the absence of the phenolic stabilizer. The aliphatic amino compounds usually cause less staining than the aromatic amino compounds, the acid hydrazides being particularly good in this respect.

U.S. Pat. No. 3,367,907 to Hansen teaches polyolefin compositions stabilized against degradation accelerated by the presence of copper. There is incorporated in the polymer an antioxidant, such as a phenol, and a "copper inhibitor," which can be any azimidobenzene containing the radical:

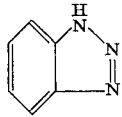

or any corresponding benzotriazine characterized by the structure:

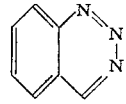

In accordance with the instant invention, heterocyclic amines and amides are provided, useful in olefin polymer compositions, such as polypropylene, containing one or more olefin polymer stabilizers, which come in contact with copper.

In the presence of amines and amides the usual catalytic effect of copper on the rate of degradation of the olefin polymer is not observed, and instead, the olefin polymer displays a resistance to degradation, enhanced by the usual olefin polymer stabilizer or stabilizer system, that is virtually as high as though the copper were not present. This is especially surprising in view of the fact that copper substantially reduces the effectiveness of most commercially available antioxidants in olefin polymers even when so called conventional "copper deactivators" are incorporated in the polymer.

Further in accordance with the instant invention, stabilizer systems for olefin polymers are provided consisting essentially of at least one olefin polymer stabilizer and a heterocyclic amine or amide of the invention, to substantially reduce and in many cases overcome any depreciative effect of copper on the olefin polymer stabilizer or olefin polymer.

In addition, in accordance with the invention, olefin polymer compositions are provided, such as propylene polymer compositions, consisting essentially of olefin polymer and at least one heterocyclic amine or amide of the invention.

Olefin polymer compositions of the invention containing a heterocyclic amine or amide can be used in contact with copper and can be combined with the usual olefin polymer stabilizers to enhance resistance to oxidative deterioration. Consequently, such olefin polymer compositions can include, optionally, at least one olefin polymer stabilizer.

Further in accordance with the instant invention, a process for enhancing the resistance of olefin polymers, such as propylene polymers, to copper-catalyzed oxidative deterioration is provided, which comprises incorporating in the olefin polymer at least one heterocyclic amine or amide as defined herein, and optionally, at least one olefin polymer stabilizer.

The olefin polymer stabilizers which can be employed in the invention include, for instance, phenols, organic phosphites, thiodipropionic acid esters, polyvalent metal salts of organic acids, and hydrocarbon sulfides and polysulfides, and conventional olefin polymer light stabilizers as will be seen hereinafter.

The heterocyclic amines and amides in accordance with the invention have the following structure:

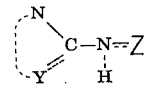

wherein the —— lines represent bonds necessary to satisfy the valences of the atoms to which they are connected,

represents a heterocyclic nitrogen-containing ring structure including at least one five or six membered ring and at least two nitrogen atoms;

Y is selected from the group consisting of nitrogen, carbon or sulfur, and

Z is a member selected from the group consisting of (1)
$$-\overset{X}{\underset{\|}{C}}-(HC_2)_a-(S)_b-(R_oS)_c-R_1$$

wherein X is selected from the group consisting of oxygen and sulfur.

R₀ is selected from the group consisting of methylene, alkyl-substituted methylene, aryl-substituted methylene and arylene, and c is 0 or 1.

R₁ is selected from the group consisting of hydrogen, alkyl having from one to about 18 carbon atoms,

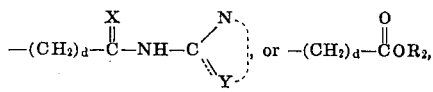

wherein R₂ is hydrogen, alkyl having from one to about 10 carbon atoms or benzyl,
a is 0, 1 or 2;
b is 1 or 2, and
d is 0, 1 or 2.

(2) 

wherein
A is selected from the group consisting of oxygen, sulfur and two hydrogen atoms, and
R₃ is selected from the group consisting of

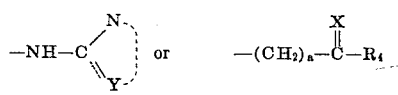

wherein R₄ is selected from the group consisting of aryl, o-hydroxyaryl, benzyl, and alkyl having from one to about 18 carbon atoms and X,

and a are as defined above;
3. two radicals, —R₅ and —R₆, wherein
R₅ is selected from the group consisting of hydrogen, methylol or ethylol and
R₆ is selected from the group consisting of methylol, ethylol or

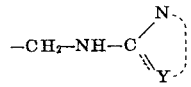

(4) 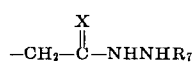

wherein
X is as defined hereinbefore and
R₇ is hydrogen, alkyl having from one to 18 carbon atoms, benzyl and aryl;
5. CH=R₈
wherein R₈ is selected from the group consisting of R₄ and (6) 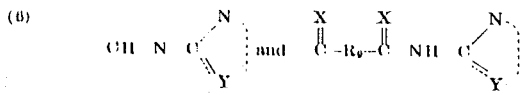

wherein R₉ is phenyl,

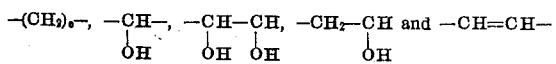

and e is an integer within the range from 0 to 6.

Typical R₁, R₂, R₄, R₇ alkyl groups include methyl, ethyl, propyl, isopropyl, n-butyl, sec-butyl, tert-butyl, pentyl, hexyl, heptyl, n-octyl, iso-octyl, nonyl, decyl, undecyl, and dodecyl; typical R₄, R₇ aryl groups include phenyl and naphthyl; typical R₄ o-hydroxyaryl groups include o-hydroxyphenyl and o-hydroxynaphthyl. Typical R₀ radicals include methylene,

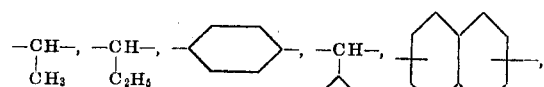

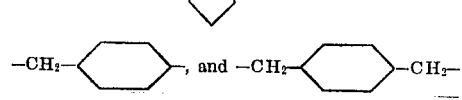

Typical heterocyclic nitrogen containing ring structures include 1,2,3-triazole, 1,2,4-triazole, imidazole, benzoimidazole, 1,2,3,4-tetrazole, imidazoline, imidazolidine, imidazolidone, imidazolone, pyrazole, pyrazolone, indazole, benzothiazole, thioazole, pyridazine, pyrimizine, quinazoline, pyrazine, piperazine, triazine, and tetrazine.

Examples of compounds falling within this invention include:

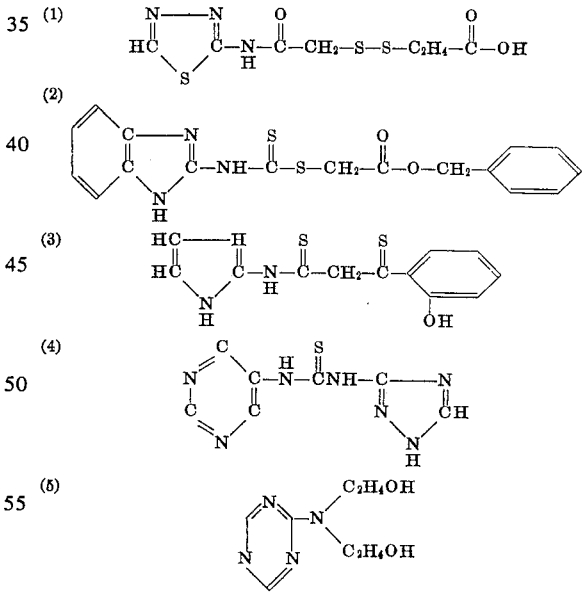

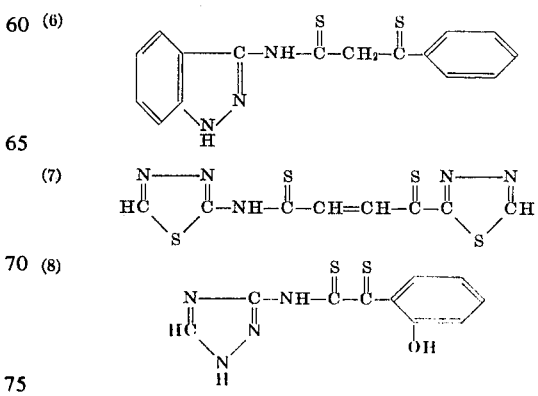

(9) 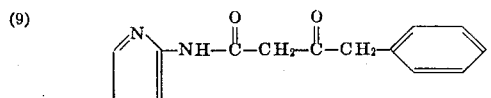

(10) 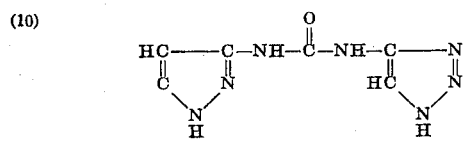

These compounds can be prepared in the following ways. For example, heterocyclic amides or thioamides of the sub-genus

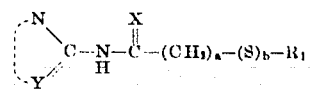

can be prepared by the reaction of a mercapto acid or mercapto thiono acid or ester with a primary heterocyclic amine according to the following reaction:

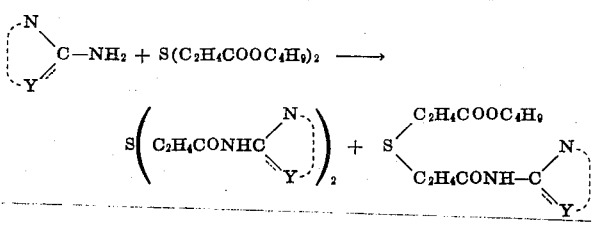

Heterocyclic amines or amides of the sub-genus

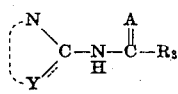

wherein A is O or S can be prepared by the reaction of a carboxylic acid or thiono acid or anhydride with a heterocyclic amine in accordance with the following reaction;

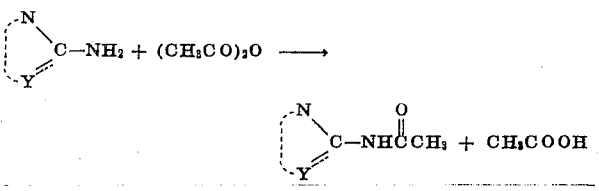

If A represents two hydrogen atoms, the heterocyclic compound can be prepared by reacting the heterocyclic amine with an aldehyde and removing the water formed in accordance with the following reaction:

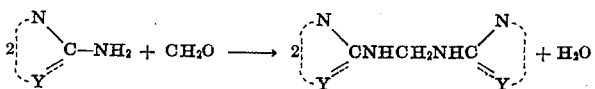

Heterocyclic amines of the sub-genus

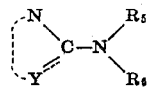

can be prepared by reaction of a heterocyclic amine with aldehyde in accordance with the following reaction:

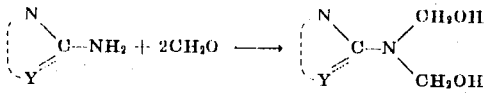

Heterocyclic amides of the sub-genus

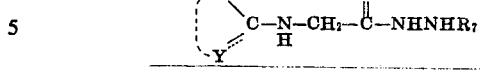

can be prepared by the reaction of a heterocyclic amine with $$ClCH_2\overset{X}{\underset{}{O}}-OR'$$

wherein R' can be lower alkyl such as methyl or ethyl, to form

, and then reacting this with $NH_2NHR_7$.

Heterocyclic amines of the sub-genus

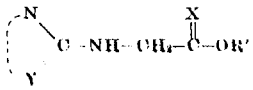

wherein $R_8$ is

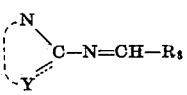

can be prepared by the reaction of a heterocyclic amine with glyoxal. If $R_8$ is aryl, o-hydroxyaryl or benzyl, the amide can be prepared by reaction of a heterocyclic amine with an aromatic aldehyde in accordance with the following reaction:

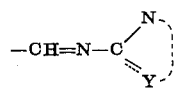

Heterocyclic amides of the sub-genus

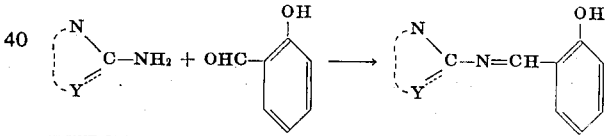

can be prepared by reaction of a heterocyclic amine with an oxalic acid diester in accordance with the following reaction:

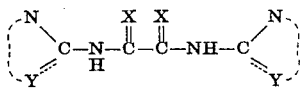

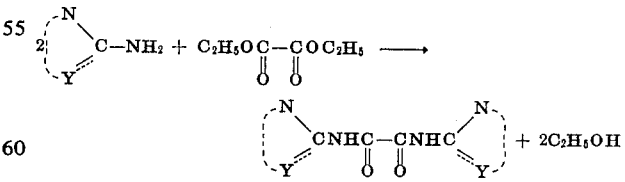

The stabilizer system of the invention comprises one or more compounds of the invention in combination with at least one olefin polymer stabilizer, and preferably, two or more such stabilizers. It is well known that in the case of olefin polymers, combinations of stabilizers can be complementary, and can enhance the resistance of the olefin polymer to oxidative deterioration. Such enhanced stabilizing effectiveness when present in the olefin polymer stabilizer combination continues to be evidenced in the presence of the compound or compounds of the invention.

Stabilizer systems of the invention comprising a compound of the invention and an olefin polymer stabilizer can be formulated and marketed as such, ready for use by the converter of the olefin polymer into useful products.

A variety of olefin polymer stabilizers can be employed of which the following are exemplary.

The organic phosphite can be any organic phosphite having one or more organic radicals attached to phosphorus through oxygen. These radicals can be monovalent radicals in the case of the triphosphites, diphosphites and monophosphites, which can be defined by the formula:

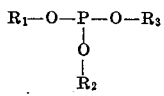

in which $R_1$, $R_2$ and $R_3$ are selected from the group consisting of hydrogen, alkyl, alkenyl, aryl, alkaryl, aralkyl, and cycloalkyl groups having from one to about 30 carbon atoms.

Also included are the organic phosphites having a bivalent organic radical forming a heterocyclic ring with the phosphorus of the type:

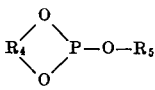

in which $R_4$ is a bivalent organic radical selected from the group consisting of alkylene, arylene, aralkylene, alkarylene and cycloalkylene radicals having from two to about 30 carbon atoms, and $R_5$ is a monovalent organic radical as defined above in the case of $R_1$, $R_2$ and $R_3$.

Also useful in the compositions of the invention are mixed heterocyclic-open chain phosphites of the type:

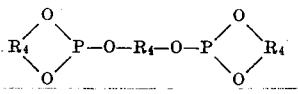

More complex phosphites are formed from trivalent organic radicals, of the type:

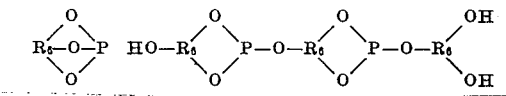

in which $R_6$ is a trivalent organic radical of any of the types of $R_1$ to $R_5$, inclusive, as defined above.

An especially preferred class of organic phosphites have a bicyclic aromatic group attached to phosphorus through oxygen, with no or one or more phenolic hydroxyl groups on either or both of the aromatic rings. These phosphites are characterized by the formula:

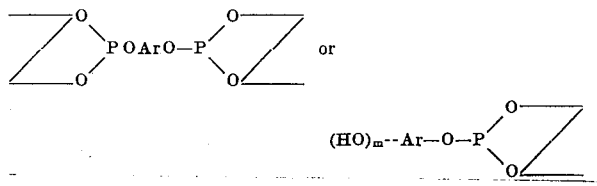

in which Ar is a mono or bicyclic aromatic nucleus and $m$ is an integer of from 0 to about 5.

Z is one or a plurality of organic radicals as defined above for $R_1$ to $R_6$, taken singly or together in sufficient number to satisfy the valences of the two phosphite oxygen atoms.

Z can also be hydrogen, and can include additional bicyclic aromatic groups of the type $(HO)_m—Ar$.

The term "organic phosphite" as used herein is inclusive of the above-described mono-, di- and triphosphites. Usually, the phosphite will not have more than about 60 carbon atoms.

Exemplary are monophenyl di-2-ethylhexyl phosphite, diphenyl mono-2-ethylhexy phosphite, di-isooctyl monotolyl phosphite, tri-2-ethylhexyl phosphite, phenyl dicylohexyl phosphite, phenyl diethyl phosphite, triphenyl phosphite, tricresyl phosphite, tri(dimethylphenyl) phosphite, trioctadecyl phosphite, triisooctyl phosphite, tridodecyl phosphite, isooctyl diphenyl phosphite, di-isooctyl phenyl phosphite, tri(t-octylphenyl) phosphite, tri(t-nonylphenyl) phosphite, benzyl methyl isopropyl phosphite, butyl dicresyl phosphite, isooctyl di(octyl-phenyl) phosphite, di(2-ethylhexyl)(isooctylphenyl) phosphite, tri(2-cyclohexylphenyl) phosphite, tri-α-naphthyl phosphite, tri(phenylphenyl) phosphite, tri(2-phenyl ethyl) phosphite, monododecyl phosphite, di(p-tert-butyl phenyl) phosphite, decyl phenyl phosphite, tert-butyl-phenyl 2-ethylhexyl phosphite, ethylene phenyl phosphite, ethylene t-butyl phosphite, ethylene isohexyl phosphite, ethylene isooctyl phosphite, ethylene cyclohexyl phosphite, 2-phenoxy-1,3,2-dioxaphosphorinane, 2-butoxy-1,3,2-dioxaphosphorinane, 2-octoxy-5,5-dimethyldioxaphosphorinane, 2-cyclohexyloxy-5,5-diethyl dioxaphosphorinane, monophenyl phosphite, 2-ethylhexyl phosphite, isoctyl phosphite, cresyl phosphite, t-octylphenyl phosphite, t-butyl phosphite, diphenyl phosphite, diisooctyl phosphite, dicresyl phosphite, dioctylphenyl phosphite, didodecyl phosphite, di-α-naphthyl phosphite, ethylene phosphite, butyl cresyl phosphite, phenyl-mono-2-ethylhexyl phosphite, isooctyl monotolyl phosphite and phenyl cyclohexyl phosphite.

Exemplary of the bis aryl phosphites are: bis(4,4'-thio-bis(2-tertiary butyl-5-methyl-phenol)) isooctyl phosphite, mono(4,4'-thio-bis(2-tertiary-butyl-5-methyl-phenol)) diphenyl phosphite, tri-(4,4'-n-butylidene-bis(2-tertiary-butyl-5-methyl-phenol)) phosphite, (4,4'-benzylidene-bis (2-tertiary-butyl-5-methyl-phenol)) diphenyl phosphite, isooctyl 2,2'-bis(-parahydroxyphenyl) propane phosphite, tridecyl 4,4'n-butylidene-bis(-2-tertiary butyl-5-methyl-phenol) phosphite, 4,4'-thiobis (2-tertiary butyl-5-methylphenol) phosphite, 2-ethylhexyl-2,2'-methylene-bis(4-methyl-6-1'-methylcyclohexyl) phenol phosphite, tri(-2,2'-bis-(parahydroxy phenyl) propane) phosphite, tri (-4,404thio-bis (2-tertiary-butyl-5-methyl-phenol) phosphite, isooctyl-(2,6-bis(2'-hydroxy-3,5-dinonylbenzyl)-4-nonyl phenyl)) phosphite, tetra-tridecyl 4,4'n-butylidene-bis(2-tertiary butyl-5-methyl phenyl) diphosphite, tetra-isooctyl 4,4'-thiobis(2-tertiary butyl-5-methyl phenyl) diphosphite, 2,2'-methylene-bis(4-methyl 6-1'-methyl cyclo-hexyl phenyl) polyphosphite, isooctyl-4,4'-isopropylidene-bis-phenyl-polyphosphite, 2-ethylhexyl-2,2'-methylene-bis(4-methyl-6,1'-methyl-cyclohexyl) phenyl triphosphite, tetra-tridecyl-4,4'-oxydiphenyl diphosphite, tetra-n-dodecyl-4,4'-n-butylidenebis (2-tertiary-butyl-5-methylphenyl) diphosphite, tetra-tridecyl-4,4'-isopropylidene bisphenyl diphosphite, hexa-tridecyl butane- 1,1,3-tris(2'-methyl-5'-tertiary-butylphenyl-4'-) triphosphite.

The phenol stabilizers contain one or more phenolic hydroxy groups, and one or more phenolic nuclei and can contain from about eight to about 300 carbon atoms. In addition, the phenolic nucleus can contain an oxy or thio ether group.

The alkyl-substituted phenols and polynuclear phenols, because of their molecular weight, have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatibility with polypropylene, inasmuch as the phenolic compound then acquires more of an aliphatic hydrocarbon character, and therefore there is no upper limit on the number of alkyl carbon atoms. Usually, from the standpoint of availability, the compound will not have more than about 18 carbon atoms in an alkyl, alicyclidene and alkylene group, and a total of not over about 50 carbon atoms. The compounds may have from one to four alkyl radicals per phenol nucleus.

The phenol contains at least one and preferably at least two phenolic hydroxyls, the two or more hydroxyls being in the same ring, if there is only one. In the case of bicyclic phenols, the rings can be linked by thio or oxyether groups, or by alkylene, alicyclidene or arylidene groups.

The monocyclic phenols which can be employed have the structure:

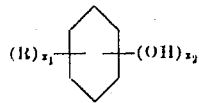

R is selected from the group consisting of hydrogen; halogen; and organic radicals containing from one to about 30 carbon atoms, such as alkyl, aryl, alkenyl, alkaryl, aralkyl, cycloalkenyl, cycloalkyl, alkoxy, and acyl

where R' is aryl, alkyl or cycloalkyl.

$x_1$ and $x_2$ are integers from one to four, and the sum of $x_1$ and $x_2$ does not exceed six.

Polycyclic phenols include aromatic nuclei which are linked by a bivalent linking radical, and are defined by the formula:

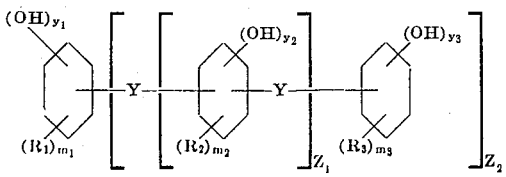

wherein $R_1$, $R_2$ and $R_3$ are inert substituent groups of the type of R above, Y is a bivalent linking radical; $m_1$ is an integer from 0 to a maximum of $5-(z_2 + y_1)$, $m_2$ can be an integer from 0 to 3 and $m_3$ an integer from 0 to 4, $z_1$ can be an integer from 0 to about 6 and $z_2$ an integer from 1 to 5, preferably 1. Preferably, the hydroxyl groups in polycyclic phenols are located ortho and/or para to Y. There can be one or more hydroxyl groups per phenyl nucleus, $y_1$, $y_2$ and $y_3$ representing the number thereof. Preferably, there will be only one hydroxyl group per phenyl nucleus. The phenolic hydroxyl may be either hindered, i.e., substituted in both positions ortho to the hydroxyl group, or partially hindered or unhindered, i.e., substituted in one or neither position.

Y can be a single bond, as in diphenyl, or a bivalent group, such as:

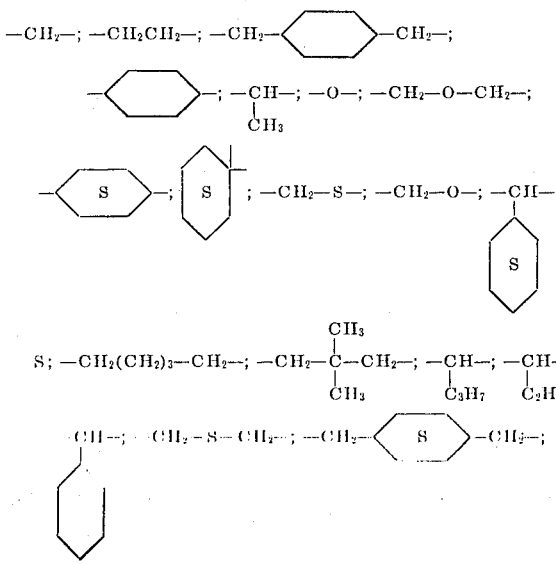

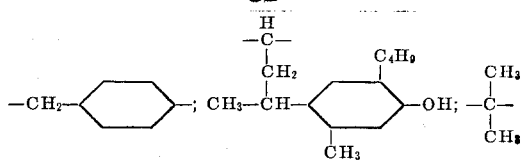

Representative phenols include guaiacol, resorcinol monoacetate, vanillin, butyl salicylate, 2,6-ditert-butyl-4-methyl phenol, 2-tert-butyl-4-methoxy phenol, 2,4-dinonyl phenol, 2,3,4,5-tetradecyl phenol, tetrahydro-α-naphthol, o-, m- and p-cresol, o-, m- and p-phenylphenol, o-, m- and p-xylenols, the carvenols, symmetrical xylenol, thymol, o-, m- and p-nonylphenol, o-, m- and p-dodecyl phenol, and o-, m- and p-octyl phenol, o- and m-tert-butyl-p-hydroxy-anisole, p-n-decyloxy phenol, p-n-decyloxy cresol, nonyl n-decyloxy cresol, eugenol, isoeugenol, glyceryl monosalicylate, methyl-p-hydroxy-cinnamate, 4-benzyloxy-phenol, p-acetylaminophenol, p-stearyl-aminophenol methyl-p-hydroxybenzoate, p-di-chlorobenzoyl-aminophenol and p-hydroxysalicyl anilide.

Exemplary polyhydric phenols are orcinol, propyl gallate, catechol, resorcinol, 4-octyl resorcinol, 4-dodecyl resorcinol, 4-octadecyl catechol, 4-isooctyl-phloroglucinol, pyrogallol, hexahydroxy benzene, 4-isohexylcatechol, 2,6-ditertiary-butyl resorcinol, 2,6-diisopropyl phloroglucinol.

Exemplary polyhydric bisphenols are methylenebis-(2,6-ditertiarybutyl-phenol), 2,2-bis-(4-hydroxy phenyl)-propane, methylene-bis(p-cresol), 4,4'-oxobis-(3-methyl-6-isopropyl phenol), 2,2'-oxobis-(4-dodecyl phenol), 4,4'-n-butylidenebis-(2-tertiary butyl-5-methylphenol), 4,4'-benzylidenebis-(2-tertiary butyl-5-methylphenol), 4,4'-cyclohexylidenebis-(2-tertiary butylphenol), 4,4'-thiobisphenol, 4,'-thiobis(3-methyl-6-tertiary-butylphenol), 2,2'-thiobis(4-methyl-6-tertiary-butyl phenol), 2,2'-methylenebis(4-methyl-6-(1'-methyl-cyclohexyl)-phenol), 2,6-bis(2'-hydroxy-3'-tertiary-butyl-5'-methylbenzyl)-4-methylphenol, 1,1,3-tris-(2'methyl-4'-hydroxy-5'-tertiary butylphenyl)butane.

The thiodipropionic acid ester has the following formula:

$$R_1OOCCH_2CH_2-S-CH_2CH_2COOY$$

in which $R_1$ is an organic radical selected from the group consisting of hydrocarbon radicals such as alkyl, alkenyl, aryl, cycloalkyl, mixed alkyl aryl, and mixed alkyl cycloalkyl radicals; and esters thereof with aliphatic carboxylic acids; and Y is selected from the group consisting of (a) hydrogen, (b) a second R radical $R_2$, which can be the same as or different from the $R_1$ radical, (c) a polymeric chain of $n$ thiodipropionic acid ester units:

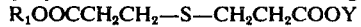
$$R_1O[OCCH_2CH_2SCH_2CH_2COOXO]_nOCCH_2CH_2-S-CH_2CH_2COOZ$$

where Z is hydrogen, $R_2$ or M; $n$ is the number of thiodipropionic acid ester units in the chain; and X is a bivalent hydrocarbon group of the type of $R_1$; the value of $n$ can range upwards from 1, but there is no upper limit on $n$ except as is governed by the ratio of carbon atoms to sulfur atoms as stated below; and (d) a polyvalent metal M of Group II of the Periodic Table such as zinc, calcium, cadmium, barium, magnesium and strontium.

The molecular weights of the R and Y radicals are taken such that with the remainder of the molecule, the thiodipropionic ester has a total of from about 10 to about 60 carbon atoms per sulfur atom.

Accordingly, the various thiodipropionic acid ester species coming within the above-mentioned categories within the general formula can be defined as follows:

a. $R_1OOCCH_2CH_2SCH_2CH_2COOH$
b. $R_1OOCCH_2CH_2SCH_2CH_2COOR_2$
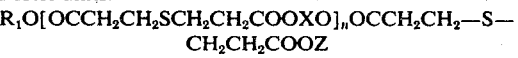
c. $R_1O[OCCH_2CH_2SCH_2CH_2COOX-O]_nOCCH_2CH_2SCH_2CH_2COOZ$
d. $[R_1OOCCH_2CH_2SCH_2CH_2COO]_2M$ In the above formulae $R_1$ and $R_2$ M, X and Z are the same as before. In the polymer (c), as in the other forms of thiodipropionic acid esters, the total number of carbon atoms per sulfur atom is within the range from about 10 to about 60.

The R radical of these esters is important in furnishing compatibility with the polypropylene. The Y radical is desirably a different radical, $R_2$ or M or a polymer, where R is rather low in molecular weight, so as to compensate for this in obtaining the optimum compatibility and nonvolatility. Where Y is a metal, the thiodipropionic acid ester furnishes the beneficial properties of the polyvalent metal salt which is described below.

The aryl, alkyl, alkenyl and cycloalkyl groups may, if desired, contain inert, nonreactive substituents such as halogen and other carbocyclic and heterocyclic ring structures condensed therewith.

Typical R radicals are, for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, oleyl, phenyl, xylyl, tolyl, ethylphenyl, naphthyl, cyclohexyl, benzyl, cyclopentyl, methylcyclohexyl, ethylcyclohexyl, and naphthenyl, hydroxyethyl, hydroxypropyl, glyceryl, sorbityl, pentaerythrityl, and polyoxyalkylene radicals such as those derived from diethylene glycol, triethylene glycol, polyoxypropylene glycol, polyoxyethylene glycol, and polyoxypropyleneoxyethylene glycol, and esters thereof with any of the organic acids named below in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexamethylene, decamethylene, alkyl- and aryl- substituted alkylene radicals such as 1,2-propylene,

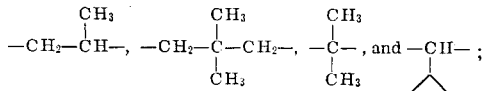

arylene radicals such as phenylene

methylenephenylene

dimethylene phenylene,

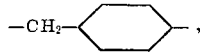

and alicyclene radicals such as cyclohexylene

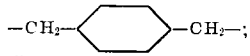

and cyclopentylene

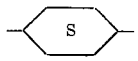

As exemplary of the thiodipropionic acid esters which can be used, there can be mentioned the following: monolauryl thiodipropionic acid, dilauryl thiodipropionate, butyl stearyl thiodipropionate, di(2-ethylhexyl)-thiodipropionate, diisodecyl-thiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soybean oil fatty alcohols and thiodipropionic acid, cyclohexyl nonyl thiodipropionate, monooleyl thiodipropionic acid, hydroxyethyl lauryl thiodipropionate, monoglyceryl thiodipropionic acid, glyceryl monostearate monothiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono-(dodecylbenzyl) thiodipropionic acid.

These esters are for the most part known compounds, but where they are not available, they are readily prepared by esterification of thiodipropionic acid and the corresponding alcohol.

When the compound is used in conjunction with a polyvalent metal salt of an organic acid, the polyvalent metal salt of an organic acid will ordinarily have from about six to about 24 carbon atoms. The polyvalent metal can be any metal of Group II of the Periodic Table, such as zinc, calcium, cadmium, barium, magnesium and strontium. The alkali metal salts and heavy metal salts such as lead salts are unsatisfactory. The acid can be any organic non-nitrogenous monocarboxylic acid having from six to 24 carbon atoms. The aliphatic, aromatic, alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms. and such acids may if desired have inert, nonreactive substituents such as halogen, hydroxyl, alkyl radicals, alkenyl radicals and other carbocyclic ring structures condensed therewith. The oxygen-containing heterocyclic compounds can be aromatic or nonaromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxy capric acid, benzoic acid, phenylacetic acid, butyl benzoic acid, ethyl benzoic acid, propyl benzoic acid, hexyl benzoic acid, salicylic acid, naphthoic acid, 1-naphthalene acetic acid, orthobenzoyl benzoic acid, naphthenic acids derived from petroleum, abietic acid, dihydroabietic acid, hexahydrobenzoic acid, and methyl furoic acid.

The water-insoluble salts are preferred, because they are not leached out when the plastic is in contact with water. Where these salts are not known, they are made by the usual types of reaction, such as by mixing the acid, acid chloride or anhydride with the corresponding oxide or hydroxide of the metal in a liquid solvent, and heating, if necessary, until salt formation is complete.

The hydrocarbon sulfides and polysulfides can contain one sulfur atom or two or more sulfur atoms linked in a polysulfide unit. Usually, the sulfides and polysulfides will not have more than 50 carbon atoms. They can be defined by the formula:

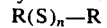

wherein $n$ is the number of sulfur atoms and ranges from one to about six, and R is an organic radical having from one to about 30 carbon atoms, such as alkyl, aryl, alkaryl, aralkyl, and cycloalkyl. The following compounds are typical: dibutyl sulfide, didecyl sulfide, diphenyl sulfide, dibenzyl sulfide, butyl octyl sulfide, di-n-dodecyl trisulfide, ditertiary dodecyl disulfide, di-para-tertiary butyl phenyl trisulfide, dibenzyl disulfide, dibenzyl tetra sulfide, and dibenzyl trisulfide.

Light stabilizers for olefin polymers can also be added, for example, 2-hydroxy benzophenones, o-hydroxyphenylbenzotriazoles, 1-dioxides of α,β-benzoisothiazolones and 1,3,5-triazines and nickel organophosphites as disclosed in application Ser. No. 487,614, now U.S. Pat. No. 3,395,112, dated July 30, 1968.

In another embodiment of the invention, as previously indicated, one or more compounds of the invention can be combined with the olefin polymer. Such compositions are readily marketed by the polymer manufacturer as an olefin polymer which can be used in contact with copper, and can be combined with the usual olefin polymer stabilizers by the converter in the usual way, without any modification whatsoever, so as to obtain the benefits of the invention due to the presence in the formulation of a compound of the invention. Such compositions have the special advantage that they can be processed using the usual techniques, and, in addition, the usual olefin polymer stabilizer systems will behave virtually in their normal way, even when the composition is in contact with copper.

The preferred stabilizer system of the invention comprises the compounds of the invention and two olefin polymer stabilizers, a phenol, and a thiodipropionic acid ester. An additional fourth ingredient which is included in the preferred systems of the invention but which is not essential is an organic phosphite, and a fifth optional ingredient is a polyvalent metal salt of an organic acid. The olefin polymer stabilizers together give an enhanced stabilization which is not obtainable from any of them alone or in combinations of two with the compound of the invention.

A further improvement in resistance to degradation is obtained if to the stabilizer composition of the invention there be added polyols, such as pentaerythritol and/or dipentaerythritol; or trimethyol propane; oxyacids such as malic acid, tartaric acid or citric acid; epoxy compounds, such as butylepoxy stearate or borate esters, such as phenyl lauryl borate, tristearyl borate and 2,6-di-t-butyl-4-methyl-phenyl borate. Only a small amount is sufficient to give a noticeable improvement. From 0.5 to 10 percent is satisfactory.

The compounds of the invention are not olefin polymer stabilizers. However, where the compounds of the invention are employed in conjunction with an olefin polymer stabilizer, such as a phenol, and a thiodipropionic acid ester, and the olefin polymer is in contact with copper, the polymer's resistance to embrittlement and reduction in melt viscosity at elevated temperatures can be almost as high as though the copper were not present. An organic phosphite and/or a polyvalent metal salt, employed in conjunction with the phenol and thiodipropionic acid ester and compounds of the invention, can further enhance resistance of the polymer to discoloration in the presence of copper. In many cases, an enhanced synergistic stabilizer activity is observed in such combinations.

The compound of the invention can minimize any catalytic effect of copper on the rate of degradation of the olefin polymer in the presence of olefin polymer stabilizers. Very small amounts can significantly reduce this effect. Amounts within the range from about 0.05 to about 5 percent by weight of the polypropylene are satisfactory. Preferably, from 0.1 to 1 percent is employed.

The amount of total stabilizer including the olefin polymer stabilizer and the compound of the invention is within the range from about 0.05 to about 5 percent, preferably from 0.1 to 2.5 percent. Of this, the olefin polymer stabilizer comprises from about 0.001 to about 4 percent by weight, and the compound of the invention from about 0.05 to about 4 percent by weight. The preferred olefin polymer stabilizer comprises from about 0.025 to about 0.5 percent of a phenol, from about 0.05 to about 1 percent of a thiodipropionic acid ester, and optionally, from about 0.05 to about 1.25 percent of a phosphite, and from about 0.025 to about 0.75 percent of a polyvalent metal salt, when present.

The compounds of the invention and the olefin polymer stabilizers may be formulated as a simple mixture for incorporation in the polymer by the polymer manufacturer or by the converter. An inert organic solvent can be used to facilitate handling, if the ingredients do not form a homogeneous mixture or solution.

Polypropylene solid polymer can be defined in a manner to differentiate it from other polyolefins as having a density within the range of from 0.86 to 0.91, and a melting point above 150° C. The stabilizer of the invention is applicable to all such polypropylenes, as distinguished from polypropylenes in the liquid form or in semiliquid or gel-like forms, such as are used as greases and waxes.

The stabilizer system of the invention is applicable to polypropylenes prepared by any of the various procedures, for the molecular weight and tacticity are not factors affecting this stabilizer. Isotactic polypropylene, available commercially under the trade names Profax, Escon and Olefane and having a softening or hot-working temperature of about 350° F, is an example of a sterically regular polypropylene polymer.

Mixtures of polypropylene with other compatible polymers and copolymers of propylene with copolymerizable monomers also can be improved in accordance with this invention. For example, mixtures of polyethylene and polypropylene, and copolymers of propylene and ethylene which contain a sufficient amount of propylene to present the instability problem that is resolved by the compounds of the invention, may be improved by the addition of one or more of the compounds of the invention, alone or in combination with other polypropylene stabilizers.

The stabilizer systems of the invention may also be used with polyolefins higher than polypropylene, such as polybutylene and polyisobutylene.

The compounds of the invention and stabilizer systems including the same are incorporated in the polymer in suitable mixing equipment, such as a mill or a Banbury mixer. If the polypropylene has a melt viscosity which is too high for the desired use, the polypropylene can be worked until its melt viscosity has been reduced to the desired range before addition of the stabilizer. However, polypropylenes in a range of workable melt viscosities are now available. Mixing is continued until the mixture is substantially uniform. The resulting composition is then removed from the mixing equipment and brought to the size and shape desired for marketing or use.

The stabilized polypropylene can be worked into the desired shape, such as by milling, calendering, extrusion or injection molding or fiber-forming. In such operations, it will be found to have a considerably improved resistance to reduction in melt viscosity during the heating, as well as a better resistance to discoloration and embrittlement on ageing and heating.

The following examples in the opinion of the inventors represent preferred embodiments of the stabilizer compositions and olefin polymer compositions of their invention.

EXAMPLES 1 TO 30a

Polypropylene compositions were prepared, stabilized by combinations of compounds of the invention and known polypropylene stabilizers, and were evaluated for their resistance to oxidative degradation in the presence of copper. An accelerated oxidation test was employed, to determine the effective useful life of the polypropylene. The time required for a polypropylene sample to absorb 10 cc. of oxygen per gram of sample, when heated at 150° C. in a closed system, was determined. This time is the induction time.

The base olefin polymer composition tested was as follows:

|  | Parts by Weight |
| --- | --- |
| Polypropylene (Profax 6501) | 100 |
| 1,1,3-tris(2'-methyl-4'-hydroxy-5'-tert-butylphenyl) butane | 0.05 |
| Distearyl thiodipropionate | 0.15 |
| Trinonylphenyl phosphite | 0.1 |
| Copper powder | 1.0 |

The components listed were mixed on a two roll mill and sheeted off to form 0.5 mm sheets. To each sample, there was also added 0.5 part of the compound listed in Table I.

As Control A, the base composition was tested, without copper. As Control B, the base composition was tested with copper. As Control C, the base composition containing added oxanilide also was tested.

Table I below sets out the results of the test for each compound tested.

TABLE I

| Example Number | Compound | Induction time (hours) |
|---|---|---|
| Control A (no copper) | None | [1] 1,200 |
| Control B (with copper) | ....do.... | <20 |
| Control C | Oxanilide | 300 |
| 1 | triazole-NH-C(=O)-CH$_2$SH | 1,430 |
| 2 | triazole-NH-C(=O)-CH$_2$CH$_3$SH | 1,450 |
| 3 | [triazole-NH-C(=O)-CH$_2$-]$_2$S | 1,400 |
| 4 | [triazole-NH-C(=O)-C$_2$H$_4$-]$_2$S | 1,450 |
| 5 | triazole-NH-C(=O)-C$_2$H$_4$-S-S-C$_2$H$_4$-C(=O)-NH-triazole | 1,450 |
| 6 | triazole-NH-C(=O)-C$_2$H$_4$-S-C$_2$H$_4$-C(=O)-O-C$_4$H$_9$ | 780 |
| 7 | triazole-NH-C(=S)-CH$_2$-SH | 1,500 |
| 8 | triazole-NH-C(=S)-NH-triazole | 1,650 |
| 9 | triazole-C(=O)-NH-CH$_2$OH | 1,200 |
| 10 | triazole-C(=O)-NH-CH$_2$-NH-C(=O)-triazole | 1,600 |
| 11 | triazole-C(=O)-NH-CH$_2$-C(=O)-NH-NH$_2$ | 1,400 |
| 12 | triazole-C(-N=CH-C$_6$H$_4$-OH) | 1,200 |

TABLE I—Continued

| Example Number | Compound | Induction time (hours) |
|---|---|---|
| 13 | (triazole)-NH-C(O)-CH₂-C(O)-CH₃ | 1,100 |
| 14 | bis-triazole structure with O=C-NH-C linkages | 1,100 |
| 15 | bis-triazole with HO-CH-C(O)-NH-C linkages | 1,550 |
| 16 | bis-triazole connected by -CH₂-C(O)-NH-C- with (CH₂)₂ bridge | 1,050 |
| 17 | triazole-NH-C(O)-CH₂SH | 1,450 |
| 18 | [triazole-NH-C(O)-C₂H₄-]₂S | 1,450 |
| 19 | triazole-NH-C(S)-NH-triazole | 1,600 |
| 20 | (imidazole)-C-NH-C(O)-CH₂-SH | 950 |
| 21 | benzimidazole-C-N=CH-C₆H₄-OH | 900 |
| 22 | (triazole)-C-NH-C(O)-CH₂-SH | 1,100 |

TABLE I—Continued

| Example Number | Compound | Induction time (hours) |
|---|---|---|
| 23 | benzotriazole-C(=O)-NH-C(=O)-C(=O)-NH-C(=O)-benzotriazole | 950 |
| 24 | NC(S)(N=N)-C-NH-C(=S)-NH-C-(N=N)(S)CH | 1,300 |
| 25 | [triazole-C-NH-C(=O)-CH₂CH₂-]₂S | |
| 26 | triazole-C-NH-C(=S)-NH-C-triazole | |
| 27 | pyrimidine-N=CH-C₆H₄-OH | 1,050 |
| 28 | pyrimidine-NH-C(=O)-CH₂-C(=O)-CH₃ | 1,200 |
| 29 | triazine with CH₂OH groups | 1,250 |
| 30 | pyrimidine-N=CH-CH=N-pyrimidine | 1,000 |
| 30a | triazole-C-NH-C(=O)-CH₂-S-CH₂-S-CH₂-C(=O)-NH-C-triazole | 1,250 |

[1] Absent copper powder.

The improvement in resistance of the polypropylene to oxidative degradation is evident.

EXAMPLES 31 to 40

The procedure described in Examples 1 to 4, 6, 10, 14, 24, 27 and 30 was repeated with the exception that 0.2 part of pentaerythritol was incorporated in the polypropylene samples.

Table II below sets out the data obtained for each compound of the invention.

TABLE II

| Example Number | Compound | Induction time (hours) |
|---|---|---|
| Control A [1] | None | 1,200 |
| Control B [2] | do | <20 |
| 31 | triazole-C-NH-C(=O)-CH₂SH | 1,600 |

Table II —Continued

| Example Number | Compound | Induction time (hours) |
|---|---|---|
| 32 |  | 1,600 |
| 33 | 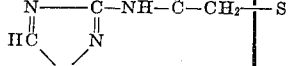 | 1,650 |
| 34 |  | 1,650 |
| 35 |  | 1,100 |
| 36 | 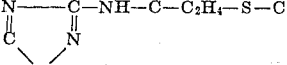 | >1,650 |
| 37 |  | 1,250 |
| 38 |  | 1,450 |
| 39 | 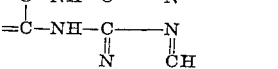 | 1,200 |
| 40 | 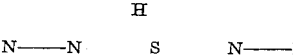 | 1,100 |

[1] No pentaerythritol (no copper).
[2] No pentaerythritol (with copper).

The improvement due to the pentaerythritol is evidenced by the data.

EXAMPLES 41 to 51

Polypropylene compositions were prepared, stabilized by a combination of a compound of the invention and known polypropylene stabilizers, and were evaluated for their resistance to oxidative degradation in the presence of copper.

The base olefin polymer composition tested was as follows:

| | Parts by Weight |
|---|---|
| Polypropylene (Profax 6501) | 100 |
| 1,1,3-tris(2'-methyl-4'-hydroxy-5'-tert-butylphenyl) butane | 0.03 |
| Distearyl thiodipropionate | 0.17 |
| Copper distearate | 0.1 |

0.5 part of the compound listed in Table III was also added. In several examples, as noted, 0.5 part malic acid was incorporated in the polypropylene samples.

The components listed were mixed on a two roll mill and sheeted off to form 0.5 mm sheets.

The test procedure described in Examples 1 to 30 was repeated.

Table III below sets out the results of the test.

TABLE III

| Example Number | Compound | Malic acid | Induction time (hours) |
|---|---|---|---|
| Control D | None | None | <17 |
| Control E | Oxanilide | do | 78 |
| Control F | Aminotriazole | do | 103 |
| Control G | None | 0.5 part | 34 |
| 41 | triazole-C(=O)-NH-C(=O)-CH₂SH | None | 1,078 |
| 42 | triazole-C(=O)-NH-C(=O)-CH₂SH | 0.5 part | 1,250 |
| 43 | triazole-C(=O)-NH-C(=O)-CH₂CH₂SH | None | 905 |
| 44 | [triazole-C(=O)-NH-C(=O)-CH₂-]₂S | do | 1,150 |
| 45 | [triazole-C(=O)-NH-C(=O)-CH₂-]₂S | 0.5 part | 1,350 |
| 46 | [triazole-C(=O)-NH-C(=O)-C₂H₄-]₂S | None | 905 |
| 47 | [triazole-C(=O)-NH-C(=O)-C₂H₄-]₂S | 0.5 part | 1,150 |
| 48 | triazole-C(=O)-NH-CH₂-C(=O)-NH-NH₂ | None | 1,078 |
| 49 | bis-triazole malic acid diamide | do | 1,350 |
| 50 | triazole-C(=O)-NH-C(=O)-CH₂SH (isomer) | do | 1,000 |
| 51 | triazole-C(=O)-NH-C(=S)-NH-C(=O)-triazole | do | 1,350 |

The improvement in resistance of the polypropylene to oxidative degradation is evident.

EXAMPLES 52 to 56

Polypropylene compositions were prepared, stabilized by combinations of compounds of the invention and known polypropylene stabilizers, and were evaluated for their resistance to oxidative degradation in the presence of copper.

The base olefin polymer composition tested was as follows:

|  | Parts by Weight |
|---|---|
| Polypropylene (Profax 6501) | 100 |
| 1,1,3-tris(2'-methyl-4'-hydroxy-5'-tert-butylphenyl)butane | 0.03 |
| Distearyl thiodipropionate | 0.17 |

To each sample there was also added 0.5 part of the compounds listed on Table IV.

The components listed were mixed on a two roll mill and sheeted off to 0.5 mm sheets. Pieces cut from the sheets were sandwiched between two copper plates each 10 mil thick. The samples were tested at 160° C. employing the general procedure of Examples 1 to 30.

As Control H, a base composition (i.e. without the compound of the invention) and as Control J, a base composition containing oxanilide, were tested.

Table IV below sets out the results of the test.

TABLE IV

| Example Number | Compound | Induction time (hours) |
|---|---|---|
| Control H | None | 17 |
| Control J | Oxanilide | 79 |
| 52 | [structure: N—C—NH—C(O)—CH₂SH triazole] | 141 |
| 53 | [structure: bis-triazole thiourea] | 128 |
| 54 | [structure: N—C—NH—C(O)—CH₂SH triazole] | 130 |
| 55 | [structure: N—N—C(HC)—NH—C(S)—NH—C—N—N with S] | 147 |
| 56 | [structure: N—C—NH—C(O)—CH₃ triazole] | 138 |

The improvement in resistance of the polypropylene to oxidative degradation is evident.

EXAMPLES 57 to 62

Polypropylene compositions were prepared, especially formulated for use in contact with copper, by the incorporation in polypropylene (100 parts) of 0.5 part of one of the compounds of the invention as listed in Table V. Such compositions can be marketed as such, and when mixed with polypropylene stabilizers will have an enhanced resistance to copper-catalyzed degradation in physical properties.

The components were mixed on a two roll mill and fluxed for 5 minutes at 170 ± 2° C. and sheeted off. The sheets were reduced to particulate form ready for marketing as such.

The polypropylene compositions thus prepared were stabilized by incorporation of a two component stabilizer system recommended for use with the compounds of the invention. The resin particles were fluxed on a two roll mill at 170 ± 2° C. and then there were added 0.1 part 1,1,3-tri-(2'-methyl-4'-hydroxy-5'-tert-butylphenyl)butane, 0.1 part dilauryl thiodipropionate, 0.5 part butyl epoxystearate and 0.1 part copper stearate, after which the composition was fluxed for 5 minutes and sheeted off to form 0.5 mm sheets.

As Control L, a sample containing 0.5 part 3-amino-1,2,4-triazole was tested.

The samples were tested employing the procedure described in Examples 1 to 30.

Table V below sets out the results of the test.

TABLE V

| Example No. | Compound | Induction time (hours) |
|---|---|---|
| Control K | None | 18 |
| Control L | Aminotriazole | 86 |
| 57 | [structure: bis(triazole-NH-C(O)-CH₂-)S] | 1,300 |
| 58 | [structure: bis-triazole thiourea] | 1,250 |
| 59 | [structure: benzimidazole-N=CH-phenol] | 1,200 |
| 60 | [structure: triazole-C(O)-NH-C(O)-CH₂-SH] | 1,250 |
| 61 | [structure: bis-pyrimidine-N=CH-CH=N-] | 1,300 |
| 62 | [structure: triazole-C(O)-NH-C(O)-CH₃] | 1,200 |

The improvement in resistance of the polypropylene to oxidative degradation is evident.

The following examples illustrate preferred embodiments of procedures for preparing heterocyclic amines and amides of the invention.

EXAMPLE A

Thiodipropionyl aminotriazole having the formula

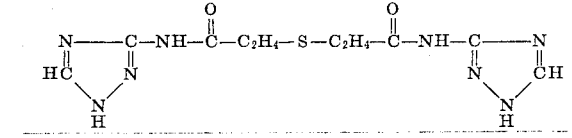

was prepared by direct fusion of thiodipropionic acid with 3-aminotriazole as follows:

44.5 g (0.25 mole) of thiodipropionic acid, 42 g (0.5 mole) 3-aminotriazole and 0.44 g p-toleuenesulfonic acid were charged into a 300 ml 3-necked flask equipped for downward vacuum distillation and the flask was immersed in an oil bath. The oil bath temperature was brought to 160° C. thereby causing the contents of the flask to melt. The contents of the flask were maintained at 160° C. for 2.5 hours. Water (8 cc) was removed at reduced pressure. After 2 hours at 160° C., the contents of the flask started to solidify and after 2.5 hours, the flask contents were completely solid. The solid was found to be thiodipropionyl aminotriazole.

EXAMPLE B

Thiodipropionyl aminotriazole was prepared by reaction of acid chloride with phenol with subsequent transamidation of the ester with 3-aminotriazole as follows:

89 g (0.5 mole) thiodipropionic acid was heated at 50° C. in an oil bath with stirring. 76 g (40 percent excess) of PCl$_3$ was gradually added over 20 minutes to the thiodipropionic acid; a thick white paste formed at first which became a more mobile paste as addition continued. After complete addition of the PCl$_3$, the white paste completely dissolved into a colorless homogeneous liquid. The liquid was heated at 70°–75° C. for 2 hours to form a lower light orange layer which was drawn off and an upper water-white layer which was vacuum stripped at 120° C. for 10–15 minutes and identified as thiodipropionyl chloride.

81 g (0.375 mole) of thiodipropionyl chloride was mixed with 200 cc xylene and the mixture was heated at 100° C. 70.5 g (0.750 mole) phenol was added and the mixture was refluxed for 3 hours at 150° C. Xylene was removed under reduced pressure.

63 g (0.750 mole) 3-aminotriazole was added and the mixture was heated at 110° C. After 10 minutes of heating, the mixture set and 200 cc toluene was added. The mixture was refluxed for 2 hours, filtered and dried at 100° C. and washed with methanol. The product was identified as thiodipropionyl aminotriazole.

EXAMPLE C

Thiodipropionyl aminotriazole was prepared from acid chloride and 3-aminotriazole as follows:

84 g (1 mole) 3-aminotriazole was mixed with 200 cc pyridine and the mixture was heated at 50° C. 108 g (0.5 mole) thiodipropionyl chloride was added over a 20 minute period. An exothermic reaction resulted raising the reaction temperature to 110° C. The mixture was heated for 2 hours at 110° C. and poured into 500 cc of water. A fine light yellow solid formed which was filtered and washed with water. The solid was identified as thiodipropionyl aminotriazole.

EXAMPLE D

A mixture of 30 g of ethyl thioglycolate and 21 g of 3-amino-1,2,4-triazole were heated to reflux for 12 hrs. in 100 parts by volume of ethanol. The mixture was cooled to room temperature and filtered. The solid product was heated with 100 parts by volume of methanol under reflux for 30 minutes and filtered and then dried in a vacuum oven at 60° C. The product (18 g) melted at 242°–242.5° C. and had an IR spectra which corresponded to that expected of a heterocyclic amide of the structure

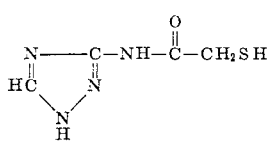

EXAMPLE E

A mixture of 31 g of β-mercaptopropionic thio acid and 21 g of 3-amino-1,2,4-triazole was stirred at 120° C. for 6 hrs. in 50 g of diethylene glycol dimethylether. The solvent and H$_2$S were then removed at reduced pressure and the residue treated with methanol and refluxed for 30 minutes. This mixture was filtered and dried in a vacuum oven at 60° C. This yielded 37 g of material melting at 160°–161° C. and having an IR spectra corresponding to a heterocyclic amide of the following structure:

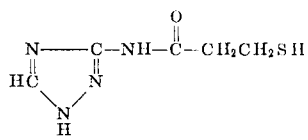

EXAMPLE F

A mixture of 66.5 g of di(β-hydroxy propyl) thiodiacetate and 24 g of 3-amino-1,2,4-triazole in 30 g of propylene glycol was stirred at 130° C. on an oil bath for 10 hrs. The propylene glycol was then removed at reduced pressure (max. 2–3 mmHg) and the solid residue treated with methanol and refluxed for 30 minutes. This mixture was filtered and dried in a vacuum oven at 60° C. This yielded 20.5 g of material melting at 280° C. (decomposed), and having an IR spectra corresponding to a heterocyclic amide of the structure

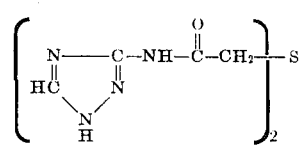

EXAMPLE G

A mixture of 45.2 g of di(p-nitrophenyl) dithiodipropionate and 16.8 g of 3-amino-1,2,4-triazole was heated to 120° C. and stirred for an hour on an oil bath. 100 g of xylene was added over a 20 minute period. The mixture was stirred at 130° C. and hot methanol was added thereto. A colorless granulated material formed which was dried in a vacuum oven at 100° C. under 2–3 mm Hg. This yielded 30.6 g of powdered material melting at 200°–215° C. and having an IR spectra corresponding to a heterocyclic amide of the structure

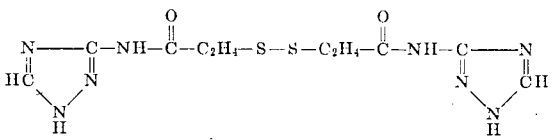

EXAMPLE H

A mixture of 58 g of dibutyl thiodipropionate and 8.4 g of 3-amino-1,2,4-triazole in 80 g of dimethyl formamide solution containing 0.4 g of sodium methoxide was heated to 120° C. and stirred for 6 hrs. The reacted mixture was evaporated under vacuum and a solid residue formed which was treated with methanol. After cooling to 10° C. the suspension mixture was filtered and dried in a vacuum oven. This yielded 27.6 g of material melting at 140.2°–150° C. and having an IR spectra corresponding to a heterocyclic amide of the structure

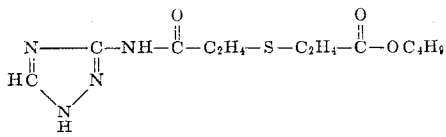

EXAMPLE J

A mixture of 12.4 g of mercapto acetic dithioacid and 16.8 g of 3-amino-1,2,4-triazole was heated to reflux for 3 hrs in 50 g of ethanol. The mixture was cooled and filtered. The solid material was dried in a vacuum oven at 40° C. and yielded 25.2 parts of material melting at 220°–230° C. and having an IR spectra corresponding to a heterocyclic thioamide of the structure

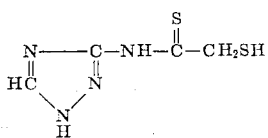

EXAMPLE K

A mixture of 25.4 g of 3-amino-1,2,4-triazole and 2.0 g of potassium hydroxide was stirred in 300 parts by volume of ethanol. 45.6 g of carbon disulfide was added and the mixture was heated to reflux for 10 hrs. After removing solvent under vacuum, the solid residue was treated with ether and dried in a vacuum oven. This yielded 19.1 g of solid material melting at 128.0°–128.4° C. and having an IR spectra corresponding to a heterocyclic thioamide of the structure

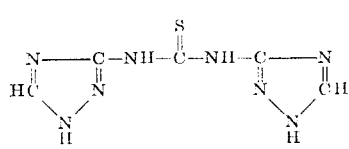

EXAMPLE L

A mixture of 21.0 g of 3-amino-1,2,4-triazole and 20 g of water solution containing a small amount of sodium hydroxide was stirred and then 21.4 g of 35 percent formaldehyde aqueous solution was added at room temperature and allowed to stand for a half an hour. The mixture was evaporated under vacuum at room temperature and a solid product formed which was ground to a powder. The powdered product was treated with ethylether, filtered, and dried. This yielded 26.3 g of solid material having an IR spectra corresponding to a heterocyclic amine of the structure

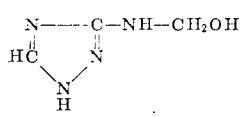

EXAMPLE M

A mixture of 21 g of 3-amino-1,2,4-triazole and 21.4 g of 25 percent formaldehyde aqueous solution in 20 g of water was allowed to stand for a half an hour. A small amount of sodium hydroxide was added to the mixture and the mixture was maintained at 70° C. an hour. A solid product was separated from the mixture, washed with water and dried in a vacuum oven. The solid material weighed 21.9 g., melted at 231°–242° C. and had an IR spectra corresponding to a heterocyclic amine of the structure

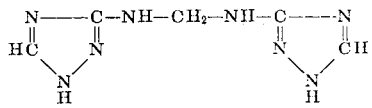

EXAMPLE N 17 g of 3-(ethoxyacyl-methylamino)-1,2,4-triazole, prepared by reaction of 3-amino-1,2,4-triazole with ethyl monochloroacetate, was added to 6.4 g. of 80 percent hydrazine hydrate aqueous solution. This mixture was stirred at 60° C. for 3 hrs. The reaction product was filtered, washed with a small amount of methanol and filtered again. The solid product had an IR spectra corresponding to a heterocyclic amine of the structure

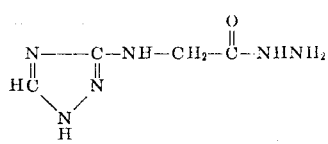

EXAMPLE O

A mixture of 33.6 g of 3-amino-1,2,4-triazole and 48.8 g of salicylaldehyde was heated on a steam bath. The mixture was stirred, 3-amino-1,2,4-triazole dissolved, and then the solution solidified. The solid product was powdered and rinsed with methanol, and dried. The product melted at 187°–190° C. and had an IR spectra corresponding to a heterocyclic amine of the structure

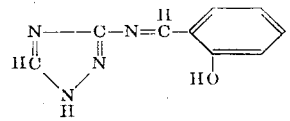

EXAMPLE P

A solution of 8.4 g of 3-amino-1,2,4-triazole in 100 g of diethylene glycol dibutylether was heated at 110° C. and 16.8 g of diketene added drop by drop over a 30 minute period. The mixture was stirred at 120° C. for an hour. A precipitate formed which was separated from the product solution and washed with hot water, and methanol. The washed solid (10.9 g) melted at 220°–225° C. and had an IR spectra which corresponded to a heterocyclic amine of the structure

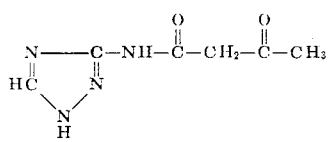

EXAMPLE Q

A mixture of 11.8 g of dimethyl oxalate and 16.8 g of 3-amino-1,2,4-triazole was heated at 160° C. and stirred for 4 hrs. thereby separating methanol and forming a solidified product. The solid was ground to a powder and treated with water. The powdered product was filtered and dried in a vacuum oven at 60° C. The dry product (21.7 g) decomposed at a temperature greater than 250° C. and had an IR spectra corresponding to a diheterocyclic diamine of the structure

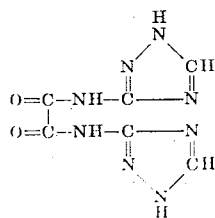

EXAMPLE R

A mixture of 33.0 g of diphenyl thiodipropionate and 16.8 g of 5-amino-1,2,3-triazole was heated to 110° C. and stirred for an hour on an oil bath. 100 parts by volume of xylene was added slowly into this reacting solution and the mixture was stirred at 110° C. for 5 hrs. The mixture was cooled to room temperature and filtered. A solid was recovered and was treated with refluxing methanol for an hour. The mixture was filtered and dried in a vacuum oven at 100° C. to yield 28.7 g of powdered material melting at 250°–252° C. and having an IR spectra corresponding to a heterocyclic amide of the structure

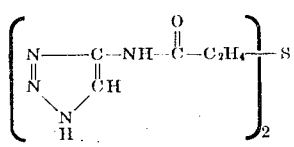

EXAMPLE S

A mixture of 30 g of ethyl thioglycolate and 20.5 g of 2-amino-imidazole was heated to reflux for 12 hrs. in 100 parts by volume ethanol. The mixture was cooled to room temperature and filtered. The solid product was heated with 100 parts by volume methanol under reflux for 30 minutes and filtered and then dried in a vacuum oven at 60° C. This yielded a solid material melting at 242.0°–242.5° C. having an IR spectra corresponding to a heterocyclic amide of the structure

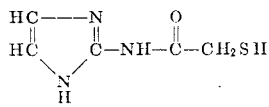

EXAMPLE T

A mixture of 20.6 g of diethyl tartarate and 16.8 g of 3-amino-1,2,4-triazole was slowly heated with stirring to 160° C. and heating was continued at 160° C. for 5 hrs. removing ethanol. After cooling at room temperature, a solid product was separated and washed with a small amount of ethanol. The solid was treated with hot methanol and dried in a vacuum oven at 30° C. This yielded 18.8 g. of solid material decomposing at 250°–253° C. and having an IR spectra corresponding to a diheterocyclic diamide of the structure

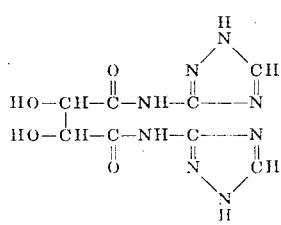

EXAMPLE U

A mixture of 13.3 g of 2-amino benzimidazole and 12.2 g of salicylaldehyde was stirred on a steam bath. The mixture was first dissolved to liquid solution, and solidified on standing for an hour. The solid product was ground to a powder and crystallized from ethanol. This material was yielded quantitively, melted at 226°–228° C. and had an IR spectra corresponding to a heterocyclic amide of the structure

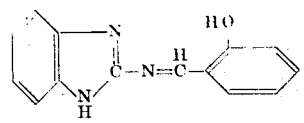

EXAMPLE V

A mixture of 9.5 g of 5-amino-pyrimizine and 12.2 g of salicylaldehyde was mixed on a steam bath. The mixture was dissolved to liquid solution and started thereafter to solidify on standing. After solidifying completely, the product was ground to powder and treated with ethanol. The powdered product was filtered and dried in a vacuum oven at 60° C. This yielded 17.4 g of solid material melting at 210° C. and having an IR spectra corresponding to a heterocyclic amine of the structure

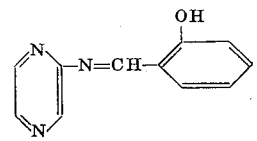

EXAMPLE W

A solution of 9.6 g of 3-amino-1,2,4-triazine in 80 g of diethylene glycol dimethyl ether was heated to 110° C. and 16.8 g of diketene added over a 30 minute period. The mixture was stirred at 120° C. for an hour. A light brown precipitate formed and was separated from the reaction mixture and treated with boiling water. The solid product was washed with methanol and dried in a vacuum oven at room temperature. This yielded 14.8 g of a brown powder having an IR spectra corresponding to the structure

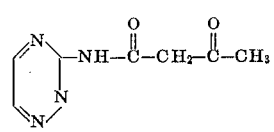

EXAMPLE X

A mixture of 21 g of 3-amino-1,2,4-triazole in 100 g of ethanol solution containing a trace of sodium hydroxide was dissolved and 22.5 g of paraformaldehyde added slowly thereto. The mixture was stirred at 60° C. for an hour. The mixture was filtered and washed to form a solid solution having an IR spectra corresponding to the structure

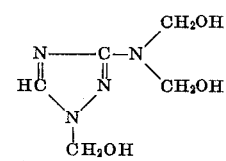

EXAMPLE Y

A mixture of 9.6 g of 2-amino-1,3,5-triazine and 8.7 g of 30 percent glyoxal aqueous solution in 50 g of water was stirred and heated slowly on a steam bath. A precipitate formed which was filtered and washed with water three times. The washed material had an IR spectra corresponding to the structure

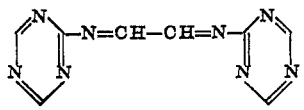

We claim:

1. Alpha-monoolefin polymer compositions which when combined with one or more alpha-monoolefin polymer stabilizers have an enhanced resistance to copper-catalyzed degradation in physical properties, consisting essentially of an alpha-monoolefin polymer and at least one amine or amide having the formula

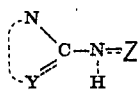

wherein

represents a heterocyclic ring selected from the group consisting of 1,2,3-triazole, 1,2,4-triazole, imidazole, benzoimidazole, 1,2,3,4-tetrazole, imidazoline, imidazolidine, imdazolidione, imidazolone, pyrazole, pyrazolone, indazole, benzothiazole, thiazole, pyridazine, pyrimizine, quinazoline, pyrazine, piperazine, triazine, and tetrazine, and Z is selected from the group consisting of (1) 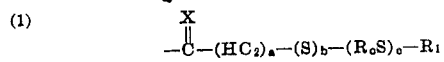

wherein $R_o$ is selected from the group consisting of methylene, alkyl-substituted methylene, aryl-substituted methylene and arylene, $R_1$ is selected from the group consisting of hydrogen, alkyl having from one to about 18 carbon atoms,

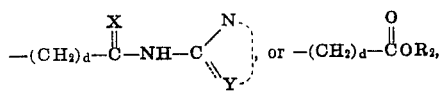

wherein $R_2$ is hydrogen, alkyl having from one to about 10 carbon atoms or benzyl,

2.

wherein A is selected from the group consisting of oxygen, sulfur and two hydrogen atoms, and $R_3$ is selected from the group consisting of

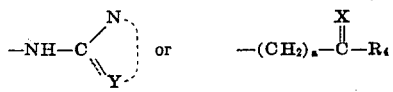

wherein $R_4$ is selected from the group consisting of aryl, o-hydroxyaryl, benzyl, and alkyl having from one to about 18 carbon atoms;

3. two radicals, —$R_5$ and —$R_6$ wherein $R_5$ is selected from the group consisting of hydrogen, methylol or ethylol and $R_6$ is selected from the group consisting of methylol, ethylol or

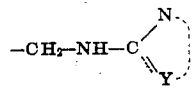

4.

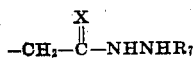

wherein $R_7$ is hydrogen, alkyl having from one to 18 carbon atoms, benzyl and aryl;

5. =CH—$R_8$ wherein $R_8$ is selected from the group consisting of $R_4$ and

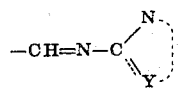

and

6.

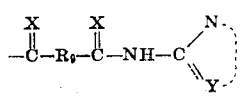

wherein $R_9$ is phenyl, —$(CH_2)_e$,

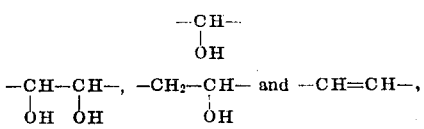

wherein $e$ is an integer within the range from 0 to 6, and

X in each of the above is selected from the group consisting of oxygen and sulfur and $a$ in each of the above is 0, 1 or 2; $b$ is 1 or 2; and $c$ is 0 or 1 and $d$ is 0, 1 or 2.

2. An alpha-monoolefin polymer composition in accordance with claim 1 wherein the alpha-monoolefin polymer is a propylene polymer.

3. An alpha-monoolefin polymer composition in accordance with claim 2 wherein the propylene polymer is polypropylene.

4. An olefin polymer composition in accordance with claim 1 including, in addition, at least one alpha-monoolefin polymer stabilizer selected from the group consisting of organic phosphites, alkyl-substituted phenols, and polynuclear phenols, thiodipropionic acid esters, polyvalent metal salts of organic acids, hydrocarbon sulfides and polysulfides and alpha-monoolefin polymer light stabilizers, the stabilizer being compatible with polypropylene and have a low vapor pressure at alpha-monoolefin polymer working temperatures.

5. An alpha-monoolefin polymer composition in accordance with claim 4, wherein the alpha-monoolefin polymer stabilizer is a phenol.

6. An alpha-monoolefin polymer composition in accordance with claim 4, wherein the alpha-monoolefin polymer stabilizer is a thiodipropionic acid ester.

7. An alpha-monoolefin polymer composition in accordance with claim 4 wherein the alpha-monoolefin polymer stabilizer is a combination of a phenol and a thiodipropionic acid ester.

8. An alpha-monoolefin polymer composition in accordance with claim 4 wherein the alpha-monoolefin polymer stabilizer is a combination of a phenol, a thiodipropionic acid ester, and an organic phosphite.

9. An alpha-monoolefin polymer composition in accordance with claim 4 wherein the alpha-monoolefin polymer stabilizer is a combination of a thiodipropionic acid ester, and an organic phosphite.

10. A stabilizer combination useful in the enhancement of the resistance of alpha-monoolefin polymers to copper-catalyzed oxidative deterioration, consisting essentially of at least one heterocyclic amine or amide having the formula

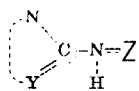

wherein

represents a heterocyclic ring selected from the group consisting of 1,2,3-triazole, 1,2,4-triazole, imidazole, benzoimidazole, 1,2,3,4-tetrazole, imidazoline, imidazolidine, imidazolidone, imidazolone, pyrazole, pyrazolone, indazole, benzothiazole, thiazole, pyridazine, pyrimizine, quinazoline, pyrazine, piperazine, triazine, and tetrazine, and Z is selected from the group consisting of (1)

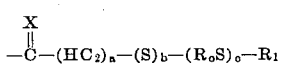

wherein $R_0$ is selected from the group consisting of methylene, alkyl-substituted methylene, aryl-substituted methylene and arylene, $R_1$ is selected from the group consisting of hydrogen, alkyl having from one to about 18 carbon atoms,

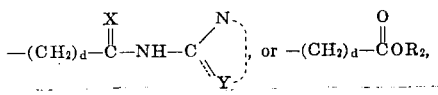

wherein $R_2$ is hydrogen, alkyl having from one to about 10 carbon atoms or benzyl,

2.

wherein A is selected from the group consisting of oxygen, sulfur and two hydrogen atoms, and $R_3$ is selected from the group consisting of

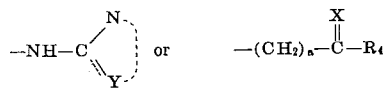

wherein $R_4$ is selected from the group consisting of aryl, o-hydroxyaryl, benzyl, and alkyl having from one to about 18 carbon atoms;

3. two radicals, —$R_5$ and —$R_6$ wherein $R_5$ is selected from the group consisting of hydrogen, methylol or ethylol and $R_6$ is selected from the group consisting of methylol, ethylol or

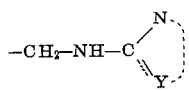

4.

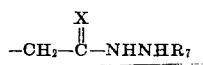

wherein $R_7$ is hydrogen, alkyl having from one to 18 carbon atoms, benzyl and aryl;

5. =CH—$R_8$ wherein $R_8$ is selected from the group consisting of $R_4$ and

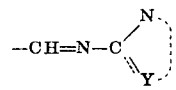

and

6.

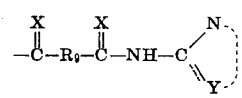

wherein $R_9$ is phenyl, —$(CH_2)_e$—,

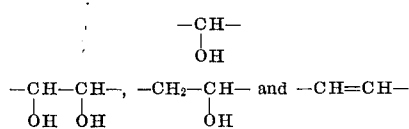

and —CH CH—,
wherein $e$ is an integer within the range from 0 to 6, and
X in each of the above is selected from the group consisting of oxygen and sulfur and
$a$ in each of the above is 0, 1 or 2; $b$ is 1 or 2; and $c$ is 0 or 1 and $d$ is 0, 1 or 2; and at least one alpha-monoolefin polymer stabilizer selected from the group consisting of organic phosphites, alkyl-substituted phenols, and polynuclear phenols, thiodipropionic acid esters, polyvalent metal salts of organic acids, hydrocarbon sulfides and polysulfides and alpha-monoolefin polymer light stabilizers, the stabilizer being compatible with polypropylene and having a low vapor pressure at olefin polymer working temperatures.

11. A stabilizer combination in accordance with claim 10 wherein the alpha-monoolefin polymer stabilizer is a phenol.

12. A stabilizer combination in accordance with claim 10 wherein the alpha-monoolefin polymer stabilizer is a thiodipropionic acid ester.

13. A stabilizer combination in accordance with claim 10 wherein the alpha-monoolefin polymer stabilizer is a combination consisting essentially of a phenol and a thiodipropionic acid ester.

14. A stabilizer combination in accordance with claim 10 including an organic phosphite.

15. A stabilizer combination in accordance with claim 13 including an organic phosphite.

* * * * *

UNITED STATES PATENT OFFICE
CERTIFICATE OF CORRECTION

Patent No. 3,673,152  Dated June 27, 1972

Inventor(s) Minagawa et al.

It is certified that error appears in the above-identified patent and that said Letters Patent are hereby corrected as shown below:

Column 2, line 54 : "25" should be -- twenty-five --

Column 4, line 56 : "wherein the ──" should be -- wherein the - - - - --

Column 4, line 77 : 
"$\overset{X}{\underset{\|}{\phantom{C}}}$
$-C-(HC_2)_9-(S)_b-(R_0S)_c-R_1$"

should be $$-\overset{X}{\underset{\|}{C}}-(CH_2)_9-(S)_b-(R_0S)_c-R_1$$

Column 5, line 7 : "18" should be -- eighteen --

Column 5, line 37 : "18" should be -- eighteen --

Column 5, line 67 : "18" should be -- Eighteen --

Column 6, line 3 : "$-(CH_2).-$" should be -- $-(CH_2)_e-$ --

Column 6, line 44
(3) : "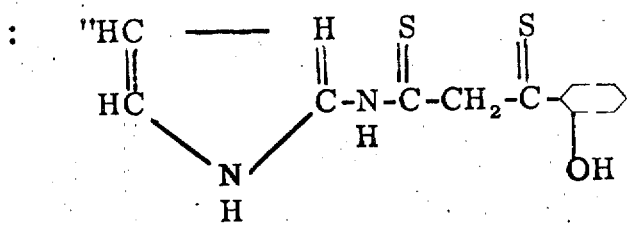"
should be
-- 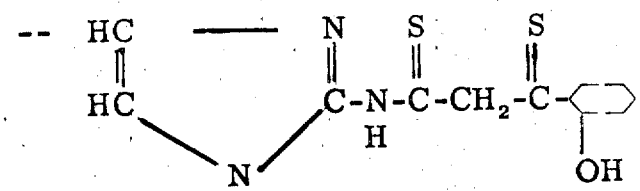 --
Column 8, line 12 : "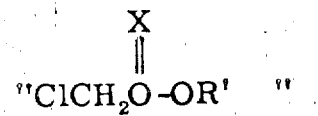"
should be
-- 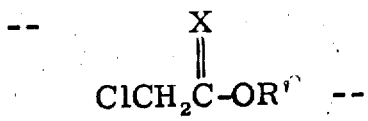 --

Column 10, line 45 : "(-4,404 thio-bis" should be -- (-4,4'-thio-bis --
Column 10, line 62 : "300" should be -- three hundred --
Column 11, line 16 : "30" should be -- thirty --
Column 11, line 71 :
"-CH" 
should be
-- -CH -- 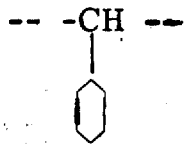
Column 13, line 63 : "thiodip opionate" should be -- thiodipropionate --
Column 13, line 67 : "ster" should be -- ester --

9-172
Column 17,
Example 2
: " 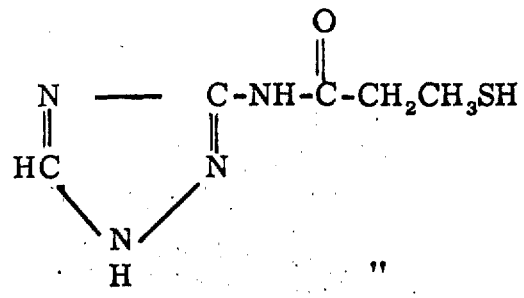 "
should be
-- 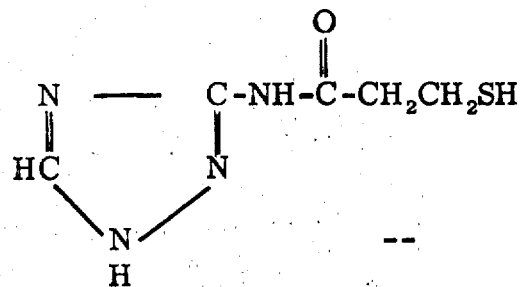 --

Column 21,
Example 24  : "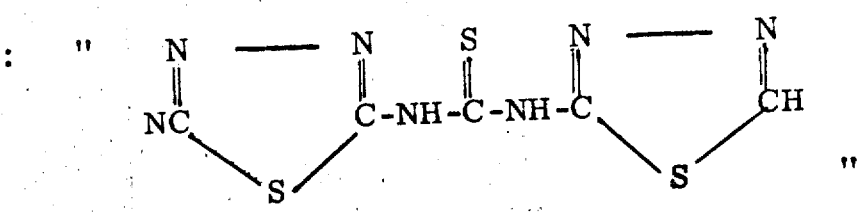"
should be
--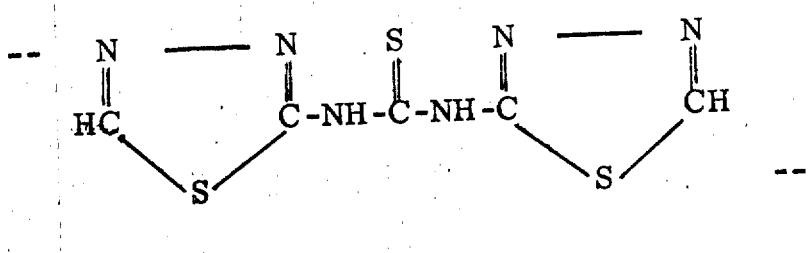--
Column 29,
line 4  : "p-toleuene" should be -- p-toluene --
Column 35, Claim 1,
line 41  : "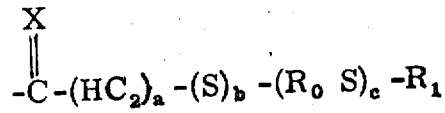
should be
--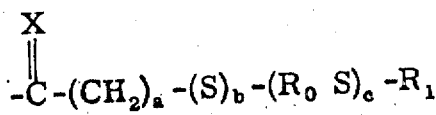--

Column 37, Claim 10, line 28 : " $-\overset{\overset{X}{\|}}{C}-(HC_2)_a-(S)_b-(R_0S)_c-R_1$ "

should be

-- $-\overset{\overset{X}{\|}}{C}-(CH_2)_a-(S)_b-(R_0S)_c-R_1$ --

Column 38, Claim 10, line 37 : Delete "and —CH —CH—,"

Signed and sealed this 10th day of April 1973.

(SEAL)
Attest:

EDWARD M. FLETCHER, JR.
Attesting Officer

ROBERT GOTTSCHALK
Commissioner of Patents